United States Patent
Hayakawa

(10) Patent No.: US 10,498,909 B2
(45) Date of Patent: Dec. 3, 2019

(54) INFORMATION PROCESSING APPARATUS, INFORMATION PROCESSING METHOD, AND STORAGE MEDIUM

(71) Applicant: CANON KABUSHIKI KAISHA, Tokyo (JP)

(72) Inventor: Mizuki Hayakawa, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 434 days.

(21) Appl. No.: 15/051,945

(22) Filed: Feb. 24, 2016

(65) Prior Publication Data

US 2016/0259604 A1    Sep. 8, 2016

(30) Foreign Application Priority Data

Mar. 6, 2015 (JP) ................. 2015-045089

(51) Int. Cl.
| | | |
|---|---|---|
| G06F 3/048 | (2013.01) | |
| H04N 1/00 | (2006.01) | |
| G06F 16/532 | (2019.01) | |

(52) U.S. Cl.
CPC ....... *H04N 1/00169* (2013.01); *G06F 16/532* (2019.01); *H04N 1/00196* (2013.01)

(58) Field of Classification Search
CPC .............. G06F 3/0481; G06K 9/00677; H04N 1/00196
See application file for complete search history.

(56) References Cited

U.S. PATENT DOCUMENTS

| | | | | |
|---|---|---|---|---|
| 6,154,755 | A * | 11/2000 | Dellert | G06F 17/30247 358/449 |
| 7,545,521 | B2 | 6/2009 | Hanamoto et al. | |
| 8,493,610 | B2 | 7/2013 | Kitagawa et al. | |
| 2002/0167683 | A1* | 11/2002 | Hanamoto | G06F 3/1205 358/1.14 |
| 2012/0294514 | A1* | 11/2012 | Saunders | G06K 9/00677 382/159 |

(Continued)

FOREIGN PATENT DOCUMENTS

| | | |
|---|---|---|
| JP | 2002-049907 A | 2/2002 |
| JP | 2002-185908 A | 6/2002 |
| JP | 2003-030223 A | 1/2003 |

(Continued)

*Primary Examiner* — Haoshian Shih
(74) *Attorney, Agent, or Firm* — Venable LLP

(57) ABSTRACT

Conventionally a user who owns images exceeding the upper limit of the number of analyzable images cannot perform automatic album creation. To solve this problem, an embodiment of this invention selects images from obtained images, in a first case where the number of the obtained images is more than a predetermined threshold, according to a predetermined condition so as to make the number of selected images equal to a predetermined threshold. In the first case, the number of selected images are analyzed. In a second case where the number of the obtained images is not more than the predetermined threshold, the obtained images are analyzed. Images among the selected images are laid out based on the analysis in the first case, and images among the obtained images are laid out based on the analysis in the second case.

20 Claims, 8 Drawing Sheets

(56) References Cited

U.S. PATENT DOCUMENTS

2015/0187092 A1* 7/2015 Jezabek .................... G06T 9/00
                                                              382/239
2015/0309701 A1* 10/2015 Jatzold ................ G06F 16/2322
                                                              715/765

FOREIGN PATENT DOCUMENTS

| JP | 2003-37731 A | 2/2003 |
| JP | 2004-234500 A | 8/2004 |
| JP | 2007-019894 A | 1/2007 |
| JP | 2009-241547 A | 10/2009 |
| JP | 2010-081528 A | 4/2010 |
| JP | 2010-191711 A | 9/2010 |
| JP | 2012023612 A * | 2/2012 |

* cited by examiner

INFORMATION PROCESSING APPARATUS, INFORMATION PROCESSING METHOD, AND STORAGE MEDIUM

BACKGROUND OF THE INVENTION

Field of the Invention

The present invention relates to an information processing apparatus, an information processing method, and a storage medium, and particularly to an information processing apparatus that can lay out a plurality of images, an information processing method, and a storage medium.

Description of the Related Art

As a conventional method of creating a photo album, there is a method (Japanese Patent Laid-Open No. 2003-037731) of automatically selecting images and arranging the images in an album by analyzing the images of a folder designated by a user.

When images of a user designated folder are to be analyzed as disclosed in Japanese Patent Laid-Open No. 2003-037731, an upper limit of the number of images usable in the analysis can be set due to resource limitations of the memory of an information processing apparatus or in order to decrease the analysis processing time to a more practical time or less.

However, if the upper limit of the number of images usable in an analysis is set, the automatic album layout function cannot be provided to a user who has a number of images exceeding the upper limit. For this reason, the user is required to select images to make the number of images equal to or less than the upper limit of an analyzable count before executing the automatic album layout function, and the convenience of analyzing images to automatically select desirable images is lost.

SUMMARY OF THE INVENTION

Accordingly, the present invention is conceived as a response to the above-described disadvantages of the conventional art.

For example, an information processing apparatus, an information processing method, and a storage medium according to this invention are capable of automatically laying out images by analyzing the images upon automatically selecting appropriate images as analysis targets.

According to one aspect of the present invention, there is provided an information processing method for an information processing apparatus that lays out a plurality of images, comprising: obtaining images; selecting images from the obtained images, in a first case where a number of the obtained images is more than a predetermined threshold, in accordance with a predetermined condition so as to make the number of the selected images equal to the predetermined threshold; analyzing the selected images in the first case, and analyzing the obtained images, in a second case where the number of the obtained images is not more than the predetermined threshold; and laying out, in the first case, images among the selected images based on the analyzing in the first case, and laying out, in the second case, images among the obtained images based on the analyzing in the second case.

The invention is particularly advantageous since, even if the images are more than a predetermined threshold, image analysis can be performed after selecting the images in accordance with a predetermined condition, and it allows a user to easily lay out the images.

Further features of the present invention will become apparent from the following description of exemplary embodiments (with reference to the attached drawings).

DESCRIPTION OF THE EMBODIMENTS

Exemplary embodiments of the present invention will now be described in detail in accordance with the accompanying drawings. Note that the relative arrangement of components and the like set forth in the embodiments do not limit the scope of the present invention unless otherwise specified.

In this specification, the terms "print" and "printing" not only include the formation of significant information such as characters and graphics, but also broadly includes the formation of images, figures, patterns, and the like on a print medium, or the processing of the medium, regardless of whether they are significant or insignificant and whether they are so visualized as to be visually perceivable by humans.

Also, the term "print medium" not only includes a paper sheet used in common printing apparatuses, but also broadly includes materials, such as cloth, a plastic film, a metal plate, glass, ceramics, wood, and leather, capable of accepting ink.

<Arrangement of Image Processing System (FIG. 1)>

Figure 1:
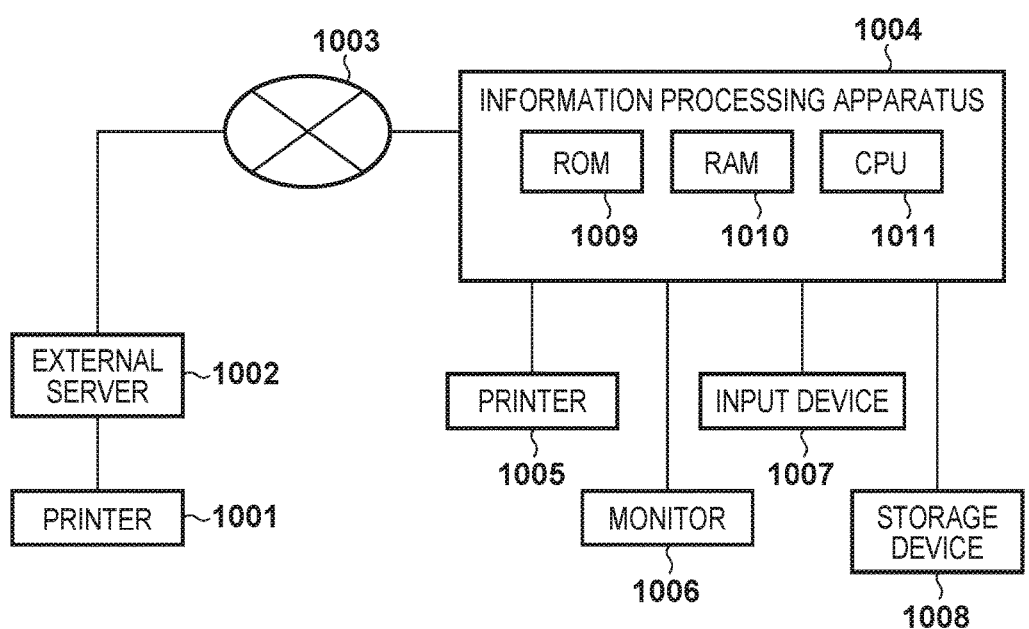
FIG. 1 is a block diagram showing the arrangement of an image processing system according to an exemplary embodiment of the present invention.

FIG. 1 is a block diagram showing the schematic arrangement of an image processing system (to be referred to as a system hereinafter) according to an embodiment of the present invention. In the arrangement of this system, an information processing apparatus 1004 is connected to an external server 1002 via a network 1003, and the external server 1002 further connects to a printer 1001.

The information processing apparatus 1004 can create an album (photo album, photo book) from input image data and output the created album as print data or upload the created album to the external server.

The information processing apparatus 1004 includes a CPU 1011, a ROM 1009, and a RAM 1010. The information processing apparatus 1004 further includes an input/output interface (not shown) for connecting with a printer 1005, a monitor 1006, an input device 1007, a storage device 1008, and the network 1003.

The CPU 1011 controls the entire information processing apparatus 1004 by executing an operating system (to be referred to as an OS hereinafter) stored in the storage device 1008, the ROM 1009, or the RAM 1010. The CPU 1011 also executes programs stored in the ROM 1009 and the RAM 1010 to implement each function of the information processing apparatus 1004 and to execute processing and calculation of information by controlling components that are included in or connected to the information processing apparatus 1004. The ROM 1009 stores programs, constants, and the like. The RAM 1010 is used as a work area of the CPU 1011. If the RAM 1010 is configured from a nonvolatile memory such as FeRAM, the RAM 1010 can also store programs.

The network 1003 is connected to the information processing apparatus 1004 and the external server 1002 and can transmit information to each connected device. The external server 1002 has an input/output interface (not shown) to connect with the printer 1001.

An album created in the information processing apparatus 1004 is uploaded to the external server 1002 via the network 1003. If the uploaded album is printable, the external server 1002 outputs the data to the printer 1001. For example, the external server 1002 operates as an album order/management server. When an album created by the image forming apparatus 1004 of a user is uploaded and a necessary album purchasing procedure is taken, the external server 1002 can print and output the album via the printer 1001. Subsequently, the output print product is bound as book and delivered to the user.

In contrast, the printer 1005 is a device for printing a print product created in the information processing apparatus 1004. Depending on the configuration, the user can print the album that he/she created by a printer 1005 which he/she owns, bind the output print product, and finish it into an album. The monitor 1006 is a display device that displays image information output from the information processing apparatus 1004. The input device 1007 is a device such as a keyboard or a pointing device used for inputting user instructions to the information processing apparatus 1004. Note that it is also possible to use a unit in which the monitor 1006 and the input device 1007 are integrated into a single device. In this case, for example, there is a device with an arrangement that has a touch panel provided on the display screen of the monitor 1006 to allow the user to input an instruction by directly touching the monitor. The storage device 1008 is a device such as an SSD (Semiconductor Storage Device) or an HDD (Hard Disk Drive) that saves image data and templates.

Note that although the information processing apparatus 1004, the monitor 1006, the input device 1007, and the storage device 1008 are described as if they were separate in the example shown in FIG. 1, depending on the configuration of the information processing apparatus, they can be integrated into a single apparatus. In other words, the arrangement can be, for example, like that of a tablet terminal in which the monitor, the input device, and the storage device (sharing the function of the RAM of the information processing apparatus in some cases) are included in the information processing apparatus.

The image data can be input by storing image data, shot and generated by an external digital camera or a portable terminal with a camera, in a memory card or a memory stick and inputting the image data via the input interface of the information processing apparatus 1004. Alternatively, if the information processing apparatus is an apparatus such as a tablet terminal, it is possible to directly use image data shot and generated from its own camera portion and stored in the storage device 1008. Alternatively, the user can download image data that he/she had uploaded to a cloud.

The following description will be made for some embodiments related to an automatic album creation operation which is to be executed in a system with the above-described arrangement.

<First Embodiment>

Figure 2:
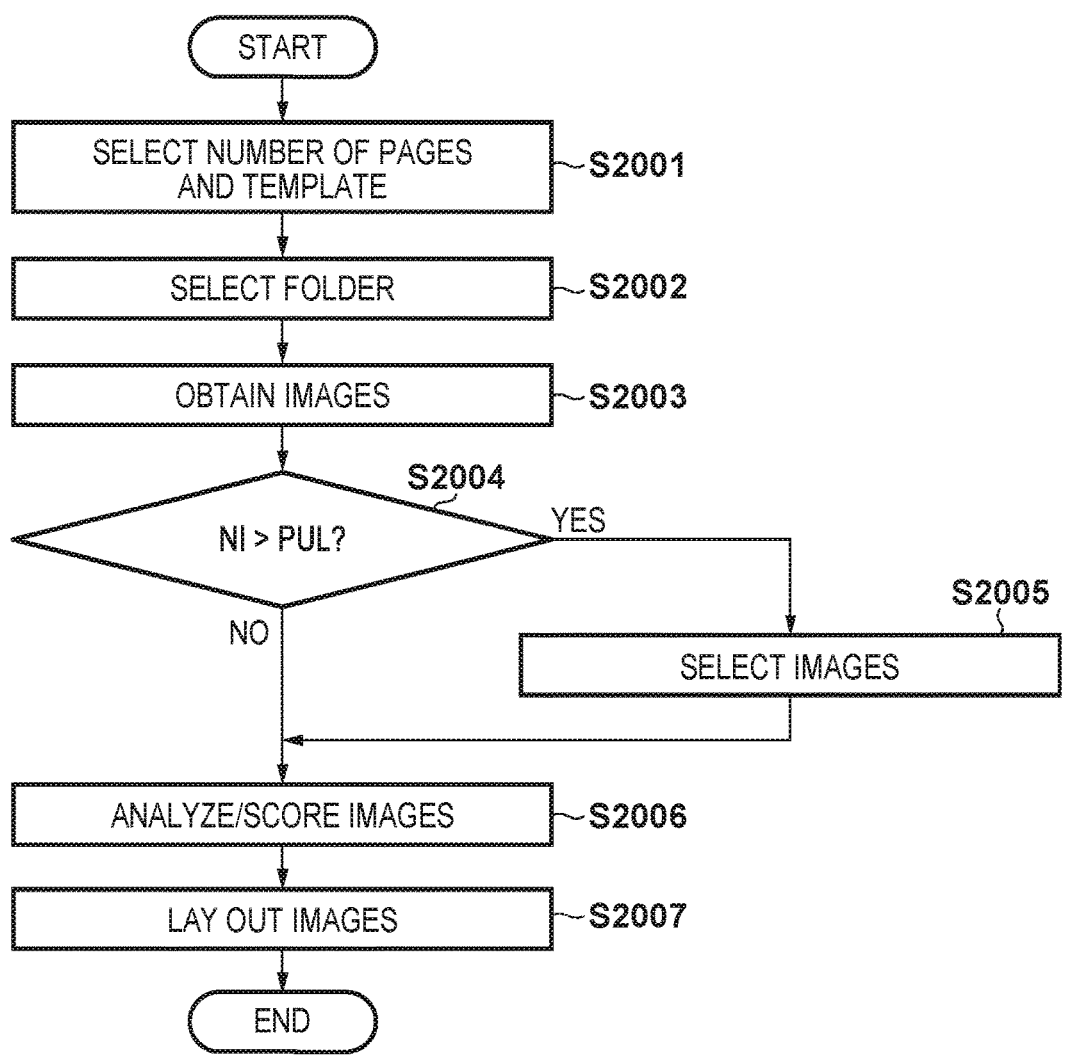
FIG. 2 is a flowchart showing automatic album creation processing according to the first embodiment.

FIG. 2 is a flowchart showing automatic album creation processing which is executed by an information processing apparatus 1004.

In step S2001, a CPU 1011 of the information processing apparatus 1004 selects the number of pages and a template according to an instruction from a user. This is implemented when the user operates an input device 1007 based on information displayed on the screen of a monitor 1006 upon execution of the automatic album creation program (to be referred to as an application hereinafter) by the CPU 1011 of the information processing apparatus 1004. Note that information display and user instruction using the monitor 1006 and the input device 1007 is called a user interface (UI).

Next, in step S2002, by executing the above-described application, the CPU 1011 selects a folder in accordance with the instruction from the user via the UI. In some cases, an image management folder may be provided by the OS operating in the information processing apparatus 1004, and the user may use the image management folder provided by the OS. Therefore, in such a case, the CPU 1011 can skip step S2002 and select the image management folder provided by the OS as the default folder.

Further, in step S2003, the CPU 1011 obtains, by executing the application, the number of images included in the folder designated by user instruction in step S2002. Generally, the OS is provided with a file management function and can list files for each folder. The OS counts the number of listed files from the listed files by performing filtering based on an extension (JPG or the like) added to each image. Since another folder can be included in a folder, the OS obtains all images included in layers under the folder designated in step S2002 by recursively calling a function for listing. The application obtains the number of images from the OS by causing the OS to execute the above-described processing. The obtained images are stored in an array provided in a RAM 1010.

In step S2004, the CPU 1011 determines whether the number of images (NI) obtained in step S2003 exceeds a predetermined upper limit count for analysis (PUL: threshold). If the number of images exceeds the predetermined upper limit count for analysis (NI>PUL), the process advances to step S2005. If the number of images is equal to or less than the predetermined upper limit count for analysis (NI≤PUL), the process advances to step S2006.

By executing the above-described application in step S2005, the CPU 1011 selects images, from the images which were obtained in step S2003, to make the number of selected images equal to or less than the upper limit count for analysis by using the file information and image meta-information.

Five examples of the selection method will be described below.

Figure 3:
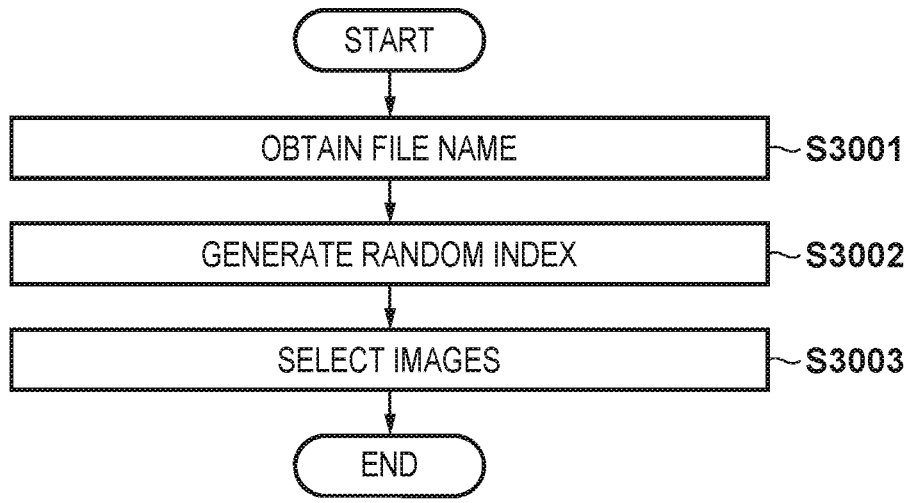
FIG. 3 is a flowchart showing selection processing that uses selection method 1.

Selection Method 1 (FIG. 3)

FIG. 3 is a flowchart showing processing by selection method 1 that uses file information to randomly select images. This processing is executed by the CPU 1011 of the information processing apparatus 1004.

First, in step S3001, the CPU 1011 obtains a file name from the file information and sets it in the array. Next, in step S3002, a {current number of images (NI)−predetermined upper limit count for analysis (PUL)–one} random array index is generated. In step S3003, images in the random array index are deleted from the array.

From the above processing, the size of the array storing the image data can be selected to be equal to or less than the predetermined upper limit count for analysis. Note that the obtaining order of file information may depend on the OS operating in the information processing apparatus, and an unintentional deviation may occur in the selection when combined with the random array index generated in step S3002. In this case, unintentional deviation is prevented by performing sorting by date and time after step S3001 by obtaining file information and file generation/update date, or the image shooting date obtained from the image meta-information.

Figure 4:
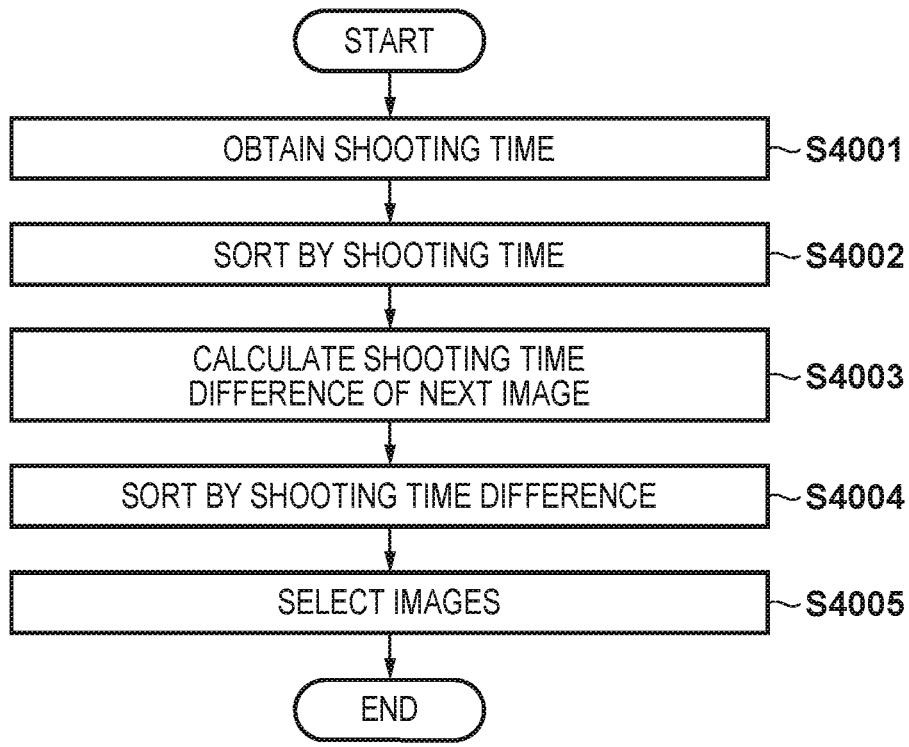
FIG. 4 is a flowchart showing selection processing that uses selection method 2.

Selection Method 2 (FIG. 4)

FIG. 4 is a flowchart showing processing by selection method 2 that uses image meta-information to select images with long shooting intervals. This processing is executed by the CPU 1011 of the information processing apparatus 1004. Selection method 2 is effective when similar photographs are shot in a short period of time by a continuous shooting function or the like of a camera and can create an album by removing the similar images before the analysis.

First, in step S4001, the CPU 1011 obtains shooting times as image meta-information. In step S4002, the CPU 1011 sorts the image array in the ascending order by using the shooting time as the key. Further, in step S4003, shooting time differences between adjacent images are calculated in the sorted order.

In step S4004, the CPU 1011 sorts the image array in the ascending order by using the shooting time differences as the key. Then, in step S4005, the CPU 1011 deletes (NI–PUL–1) images from the image array starting from the head (from an image with the smallest shooting time difference) of the image array sorted according to the shooting time differences in step S4004.

From the above processing, the size of the image array storing the images can be selected to be equal to or less than the predetermined upper limit count for analysis.

Figure 5:
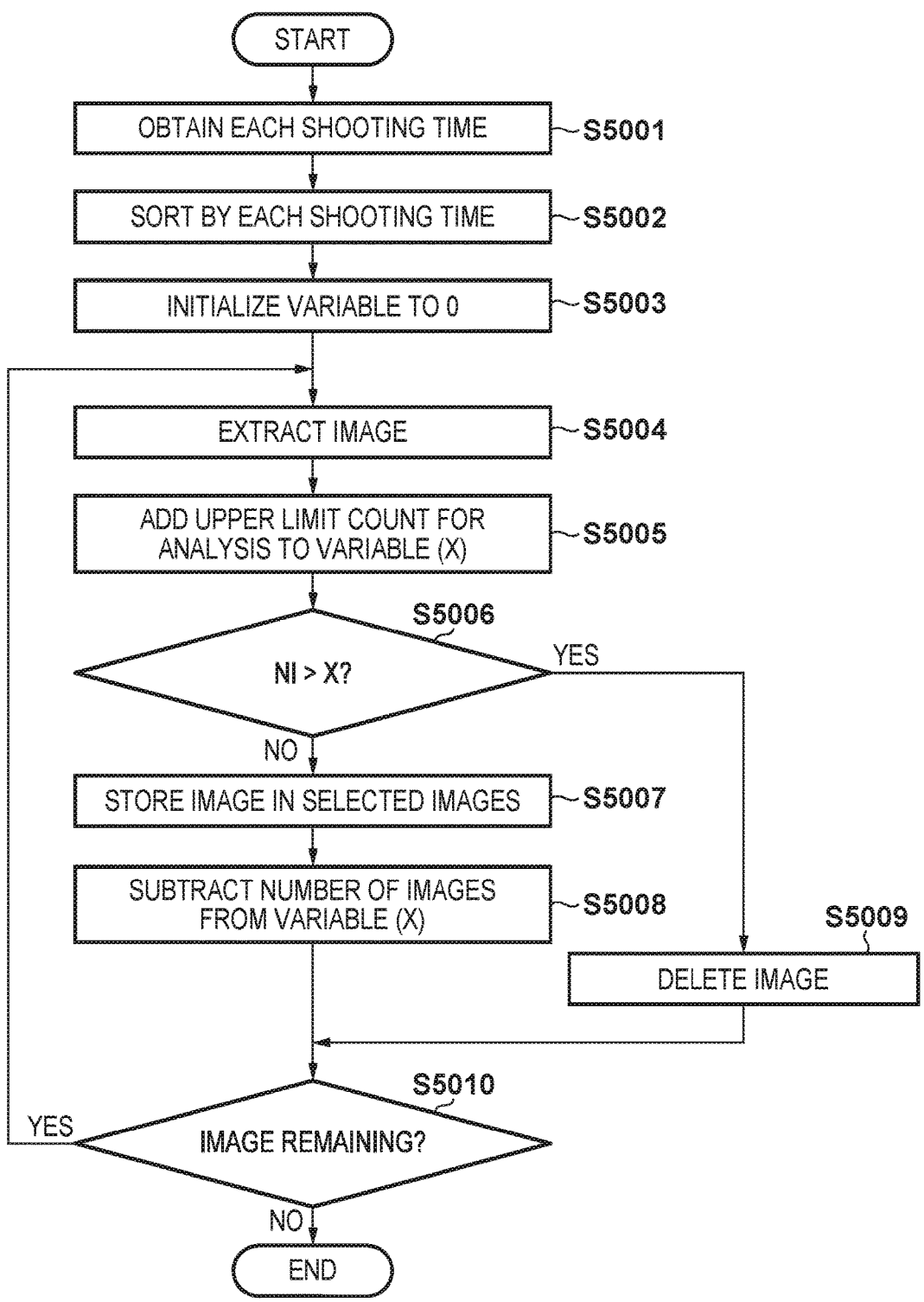
FIG. 5 is a flowchart showing selection processing that uses selection method 3.

Selection Method 3 (FIG. 5)

FIG. 5 is a flowchart showing processing by selection method 3 that uses image meta-information to select images for each predetermined number of images. According to this processing, for example, when there are 100 image analysis candidate images and the predetermined upper limit count for analysis is 50 images, the 100 images are sorted by using shooting times as image meta-information. Then in the sorted order of 100 images, every two images, that is, 50 images are selected in an even number sequence (2, 4, 6 [ . . . ] 100). A detailed description will be given below. Note that this processing is executed by the CPU 1011 of the information processing apparatus 1004.

In step S5001, the CPU 1011 obtains, as image meta-information, the shooting time of each image stored in the image array. In step S5002, the CPU 1011 sorts the image array in the ascending order by using the shooting times as the key. NI images are stored in this image array. For example, in the above-described example, 100 images are set as the NI.

Next, in step S5003, the CPU 1011 initializes a variable x to "0". This variable x is used, as will be described later in step S5006, to determine whether an image of interest is to be an image analysis target by comparing the variable x with the number of images NI. Then, in step S5004, one image is extracted from the head of the image array sorted by the shooting times. In step S5005, the predetermined upper limit count for analysis (PUL) is added to the variable x (x←x+PUL). In the above-described example, PUL is 50, and 50 is set as the variable x when the process of step S5005 is first executed.

In step S5006, the CPU 1011 compares the variable x and the number of images. The number of images is the total number of images (NI, for example, 100) obtained based on the image meta-information in step S5001. If the variable x is equal to or more than the number of images (x≥NI), the process advances to step S5007. If the variable x is less than the number of images (x<NI), the process advances to step S5009.

For example, in the above-described embodiment, if the first image (for example, an image with the oldest shooting time) from an order of images sorted as described above has been extracted in step S5004, the process advances to step S5009 since x (50)<NI (100).

In step S5009, the image extracted from the image array in step S5004 is discarded. That is, this image does not become an image analysis target. Thus, the number of images stored in the image array is decreased by one. Then, in step S5010, the CPU 1011 determines to return the process to step S5004 if another image remains in the image array.

For example, the process returns from step S5010 to step S5004, and the second image (for example, an image with the second oldest shooting time) in the order of images sorted as described above is extracted in step S5004. In this case, in step S5005, PUL (50) is added to the variable x (50) of that time. Therefore, since x (=100)≥NI (=100) in step S5006, the process advances to step S5007.

In step S5007, the CPU 1011 stores the image obtained in step S5004 in the selection array. Since the obtained image is moved from the image array to the selection array, the image is selected as an image analysis target. Thus, the number of images stored in the image array is again decreased by one. Further, in step S5008, the CPU 1011 subtracts the number of images from the variable x (x←x−NI).

If the second image has been extracted in step S5004, the variable x (100) of that time is subtracted from NI (100), and the variable x becomes 0. Then, the process in step S5010 is executed.

For example, if the process again returns from step S5010 to step S5004, when the third image is extracted in step S5004 and the variable x becomes 50 in step S5005, x (=50)<NI (=100) is determined in step S5006. Therefore, the third image is removed as an image analysis target in step S5009.

The above processes are repeated until "NO" is determined in step S5010 (in the above-described example, until the 100th image is processed).

From the above processing, an image can be selected for each predetermined number of images (in the above-described example, for every two images), and the number of images stored in the selection array can be selected to be equal to or less than the predetermined upper limit count for analysis (PUL).

Figure 6:
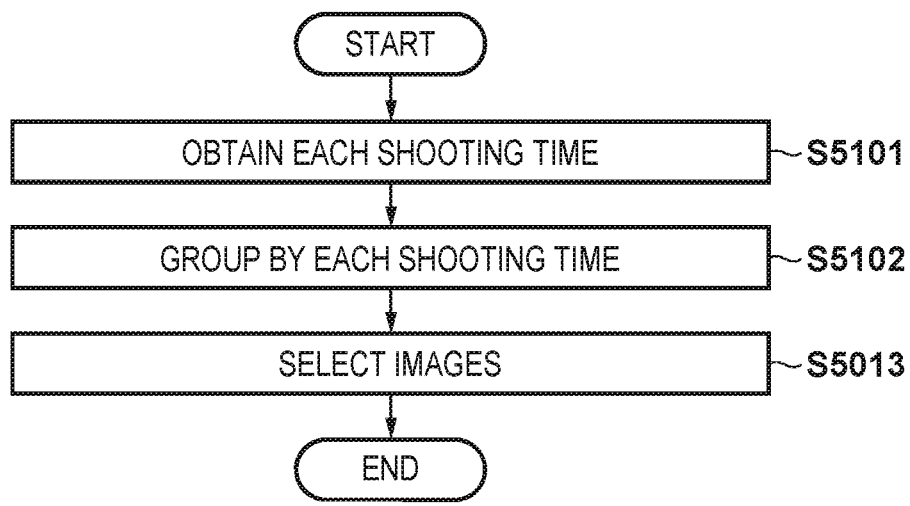
FIG. 6 is a flowchart showing selection processing that uses selection method 4.

Selection Method 4 (FIG. 6)

FIG. 6 is a flowchart showing processing by selection method 4 that selects images so that photographs from a period with a small number of images will not be excluded in a case where the number of shot photographs varies depending on a period or specific time period. For example, there may be a large number of shots for an occasion such as a seasonal event or a birthday, but a small number of shots for a casual scene of daily life. In such a case, if the above-described selection methods 1, 2, and 3 are used, the photographs from a casual scene of daily life may not be selected. Selection method 4 is a selection method used to avoid this situation. This processing is executed by the CPU 1011 of the information processing apparatus 1004.

First, in step S5101, the CPU 1011 obtains each shooting time as image meta-information.

Next, in step S5102, the CPU 1011 groups the image array by using the following condition and categorizes the image array into a plurality of image arrays. For example, the images are grouped for each specific period such as an image group whose shooting period was January 2014, an image group whose shooting period was February 2014, and so on. Then, (NI−PUL−1)/number of groups of images are deleted from each group. In this manner, images are deleted equally from each group.

In step S5103, the CPU 1011 selects the images for each group. As the method for deleting images by selection, the above-described selection method 1, 2 or 3 can be used or a predetermined method can be used. The images to be deleted can also be selected by the user.

From the above selection processing, the size of the array storing the image data can be equal to or less than the predetermined upper limit count for analysis.

Note that since there is a possibility that images of a month with a small number of shots will be excluded by the selection in a case where selection method 4 is used, the images of a month with a small number of shots can be included as analysis targets by, for example, setting the minimum number of images which are to be left in a group.

Figure 7:
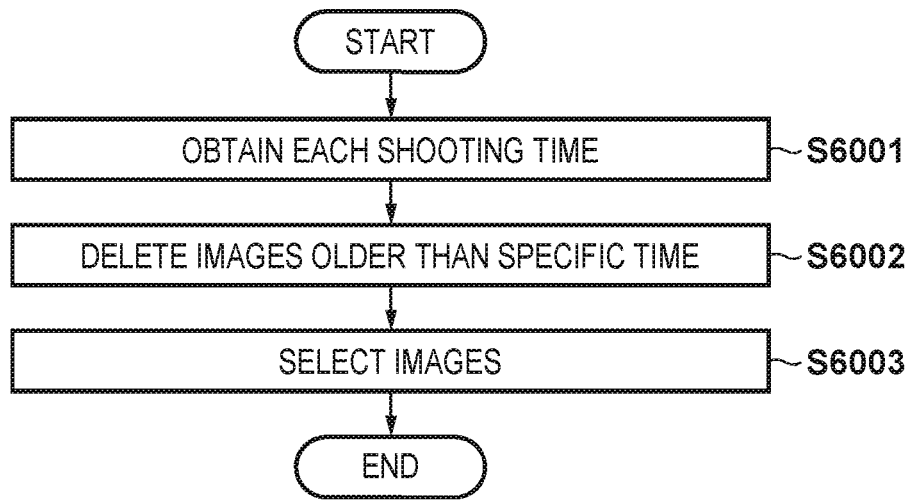
FIG. 7 is a flowchart showing selection processing that uses selection method 5.

Selection Method 5 (FIG. 7)

FIG. 7 is a flowchart showing processing by selection method 5 for selecting images when an album is to be re-created after the album has been created. For example, if an album was created one year ago, the user more likely wants to create a new album by using photographs that have been shot up till the current time since creating the old album, and it is better suited for the needs of the user to exclude photographs that were used to create the old album one year before. Selection method 5 is appropriate for such a case. This processing is executed by the CPU 1011 of the information processing apparatus 1004.

In step S6001, the CPU 1011 obtains each shooting time as image meta-information. In step S6002, the CPU 1011 deletes, from the image array, image data which is older than a specific time/period from the current date. Then, in step S6003, the CPU 1011 selects the remaining images. If the number of images to be included in the image array after the deletion is equal to or less than the predetermined upper limit count for analysis (PUL), the process advances to the analysis. If the number of images included in the image array after the deletion exceeds the predetermined upper limit count for analysis, images are selected by using one of the above-described selection methods 1 to 4.

As old images are also stored in the storage device 1008, if an album is generally created without purpose, the album will be created from images shot over a long period of time. Therefore, by using selection method 5 to limit in advance the period of images which are album creation targets, an album in which old images have been excluded can be created. As described above, in a case where the selected number of images does not become equal to or less than the predetermined upper limit count for analysis (PUL) after the selection is performed by period only, selection is further performed by using one of the above-described selection methods 1 to 4.

In addition, when selecting images, if the name of the folder storing the images has a distinctive character string, for example, a star symbol or a keyword such as "trip" or "party", it is highly possible that the folder stores images important for that user. In such a case, selection processing can be performed by excluding, as targets, folders that have folder names with distinctive character strings.

Furthermore, although the shooting date of an image was used as image meta-information for image selection in the above description, selection can be performed by using other kinds of meta-information. For example, based on image rating information, images with high ratings can be excluded from being a target but images with low ratings can be set as selection targets.

The description continues by returning to FIG. 2. In step S2006, by executing the above-described application, the CPU 1011 performs image analysis and image scoring on the obtained number of images. In step S2007, by executing the above-described application, the CPU 1011 lays out the images on a predetermined template, starting from the highest score images based on the analysis/scoring result of step S2006. Note that the layout operation of step S2007 is not limited to laying out all of the images that have undergone image analysis, and the layout operation may be performed on only some of the images with the high scores.

Therefore, according to the above described first embodiment, even if the number of images that exceeds the predetermined upper limit count for analysis is included in the folder selected by the user, automatic album creation processing can be executed by selecting the images based on image meta-information.

Although it is conventionally necessary to set a large value so that the number of images owned by the user will not reach the predetermined upper limit count for analysis, it is possible to set the predetermined upper limit count for analysis so that the processing time will be appropriate by using the methods described in this first embodiment. For example, 100 images need to be selected for a 10 page album in which 10 images are arranged on average per page, and if an album that the user wants can be created by selecting the images from 1,000 images, the predetermined upper limit count for analysis can be set to 1,000 images. By this setting, an album can be created by an approximately same amount of image analysis time for a user who owns 1,000 images or a user who owns 10,000 images.

<Second Embodiment>

An image selection method for a case in which an annual record album for a specific time period is to be created, for example, from a birthday to the same birthday of the next year, will be described in the second embodiment. Since such an album will be a record related to a specific person, this specific person will be the main character of the album. Note that the main character is not limited to a human being and any specific target object can be used.

Figure 8:
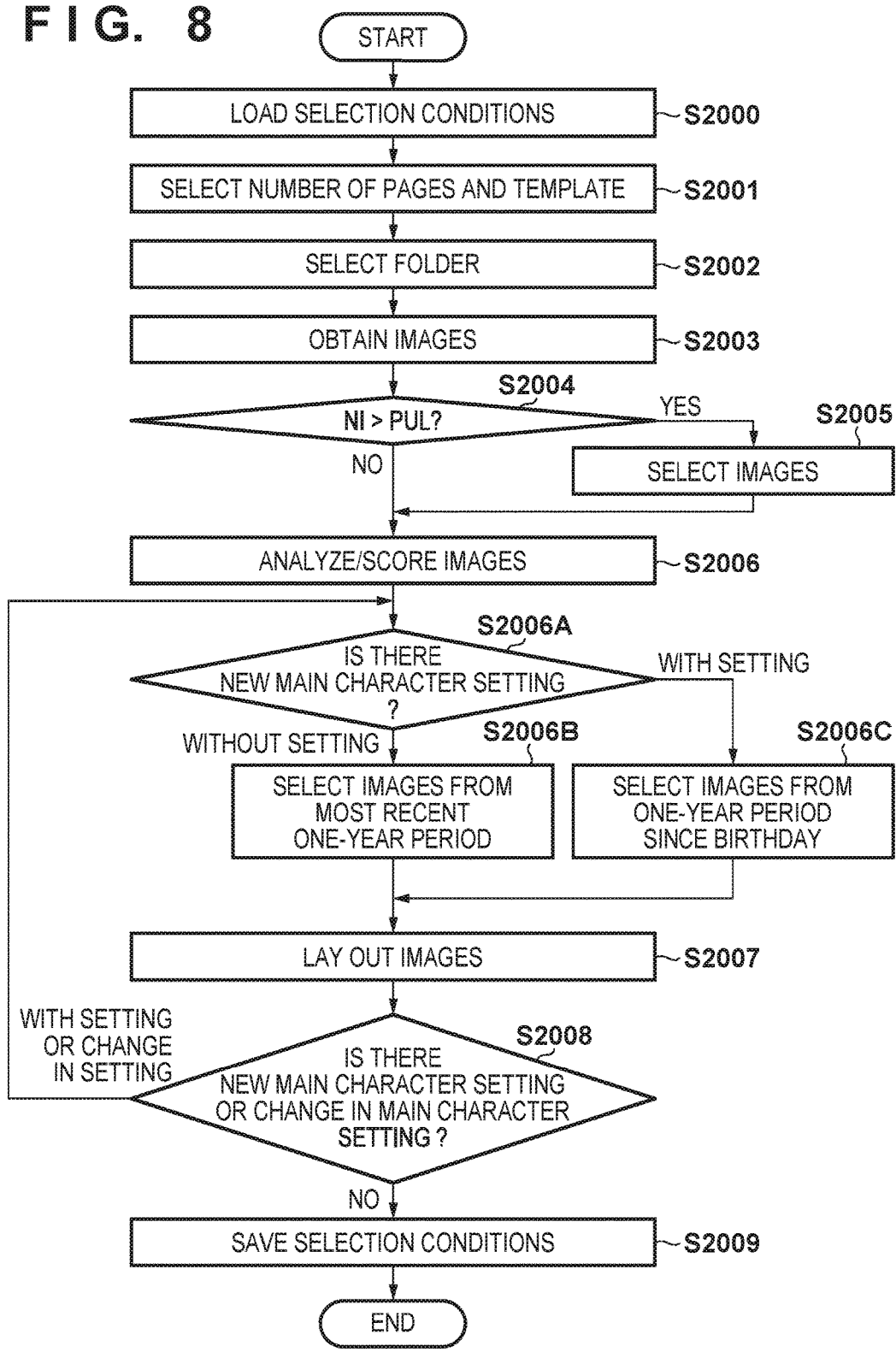
FIG. 8 is a flowchart showing automatic album creation processing according to the second embodiment.

FIG. 8 is a flowchart showing automatic album creation processing according to the second embodiment. Note that descriptions of the same processes as those already described with reference to FIG. 2 will be omitted by using the same step reference numeral in FIG. 8. Note that this processing is also implemented when a CPU 1011 of an information processing apparatus 1004 executes the above-described application.

In step S2000, the CPU 1011 loads the previously saved selection conditions. Since there are no selection conditions when an album is to be newly created, the CPU 1011 skips this process and advances to the next step. Steps S2001 to S2006 are the same as those described in the first embodiment.

Note that since there are no selection conditions when an album is to be newly created, selection method 4 described with reference to FIG. 6 of the first embodiment will be used in the image selection operation of step S2005. At this time, images are selected by setting the specific time to two years from the album creation date. If the selected number of images exceeds the predetermined upper limit count for analysis, the images are further selected so that the number of images will be equal to or less than the predetermined upper limit count for analysis (PUL) by using other methods already described in the first embodiment.

In step S2006A, the CPU 1011 confirms with the user about setting a main character. More specifically, the CPU 1011 performs display control to display the screen shown in FIG. 9 on a monitor 1006.

Figure 9:
FIG. 9 is a view showing a UI screen.

FIG. 9 is a view showing a UI screen used for setting a main character.

As shown in FIG. 9, a facial image of each person who has a high frequency of appearance in the images is displayed based on the analysis result of step S2006. If a main character is to be set, the CPU 1011 prompts the user to input a check in the box next to the appropriate facial image and also input the birthday of the person (associated information of specific target object) set as the main character. If the main character has not been set by the user at that time, the process advances to step S2006B. In contrast, if the main character has been set, the process advances to step S2006C.

In step S2006B, the CPU 1011 selects, from the images selected from the time of the two-year period in step S2005, images from the most recent one-year period. For example, if the album creation date is 2014 Nov. 8, images from the duration of the two-year period from 2012 Nov. 8 to 2014 Nov. 8 have been selected in step S2005. In step S2006B, the CPU 1011 further selects, from these selected images, images from 2013 Jan. 1 to 2013 Dec. 31. Note that since the start of a year differs depending on each culture and custom, it is desirable to allow the user to select the date in user settings and set the starting date that the user wants.

On the other hand, in step S2006C, the CPU 1011 selects, from the images of the two-year period selected in step S2005, images from the one-year period based on the birthday of the person set as the main character in step S2006A. For example, in FIG. 9, since a person born on 2002 Feb. 2 is set as the main character, images from 2013 Feb. 2 to 2014 Feb. 1 will be further selected in step S2006C.

Subsequently, the CPU 1011 executes the process in step S2007. Then, in step S2008, the CPU 1011 confirms whether there is a new main character setting or main character change after the layout. The CPU 1011 prompts user confirmation by displaying the UI screen as that shown in FIG. 9 on the monitor 1006. If there is a main character setting or main character change, the process returns to step S2006A, and the process is executed again. On the other hand, if there is no main character setting or main character change, the process advances to step S2009.

In step S2009, the CPU 1011 saves the selection conditions used in the processes up to that point.

The saved selection conditions can be used when an album is to be created next time. For example, if a main character has not been set, images from 2013 Jan. 1 to 2013 Dec. 31 are used in step S2006B. Therefore, in the next image selection (step S2005), an album which does not include similar images can be created by selecting and processing image data from 2014 Jan. 1. In a similar manner, if a main character has been set, since images from 2013 Feb. 2 to 2014 Feb. 2 has already been selected, images from Feb. 2, 2014 and after will be selected and processed in the next image selection (step S2005). Therefore, an album which does not include similar images can be created. In this manner, if one year has passed from the previous album creation date, a new album of one-year period subsequent to one-year period of the previously created album can be created without any special period settings.

Therefore, according to the above-described second embodiment, in addition to the effects described in the first embodiment, since the selection conditions of the previous album creation can be saved and loaded to be used at the time of the next album creation, a new album can be created without having to redundantly use the images which were used in the previous album creation.

<Third Embodiment>

An image selection method for a case in which an album is to be re-created by setting a period after the album had been created by image selection based on image meta-information will be described in the third embodiment.

Figure 10:
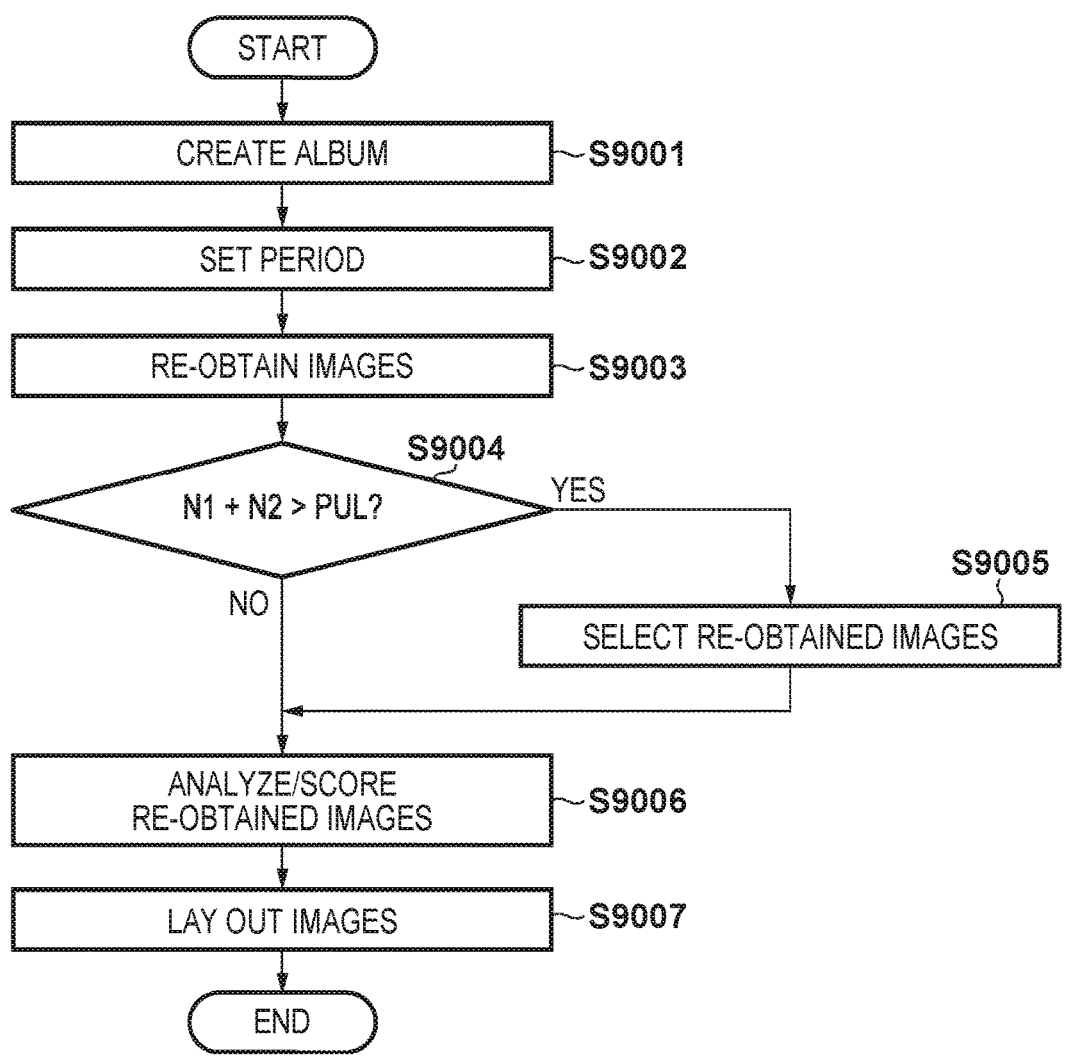
FIG. 10 is a flowchart showing automatic album creation processing according to the third embodiment.

FIG. 10 is a flowchart showing automatic album creation processing according to the third embodiment. Note that the processing is executed by a CPU 1011 of an information processing apparatus 1004.

In step S9001, the CPU 1011 executes processes according to the first or second embodiment and automatically creates an album. Note that these processes are the same as those described with reference to FIGS. 2 to 9, and a description thereof will be omitted. At this stage, the user can browse the created album by a monitor 1006.

In step S9002, the CPU 1011 prompts the user to browse the created album and set the period of the images to be included in the album to be re-created. In step S9003, images within the period set in step S9002 are re-obtained from the images selected for album creation in step S9001.

In step S9004, the CPU 1011 compares the sum of the number of images (N1) within the period set in step S9002 and the number of images (N2) re-obtained in step S9003 with a predetermined upper limit count for analysis (PUL). If the sum exceeds the predetermined upper limit count for analysis (N1+N2>PUL), the process advances to step S9005. If the sum is equal to or less than the predetermined upper limit count for analysis (N1+N2≤PUL), the process advances to step S9006.

In step S9005, the CPU 1011 selects the images re-obtained in step S9003 by using the image meta-information so that the sum of the number of images within the set period and the number of images which have been re-obtained (N1+N2) becomes equal to or less than the predetermined upper limit count for analysis (PUL). Methods described in the first embodiment can be used for this selection.

In step S9006, the CPU 1011 performs image analysis and image scoring on the re-obtained images. In step S9007, based on the image scoring result of step S9006, the images are laid out in order starting from the highest score image.

Therefore, according to the above-described third embodiment, an album can be re-created by first creating an album using all of the images owned by the user, and then setting a period from which the user wants images after the user has browsed the entire image album.

Subsequently, a desired print product can be created by transferring the image data, included in the album automatically created according to the first to third embodiments, as print data to a printer 1005 connected to the information processing apparatus 1004 or a printer 1001 connected via a network.

According to each embodiment described above, even if the number of images exceeds a predetermined threshold, the user can easily create an album since image analysis will be performed after the images are selected in accordance with predetermined conditions. Note that although each of the above embodiments has shown an example in which image selection is entirely automatically processed, the present invention is not limited to this. For example, automatic image selection processing according to each embodiment described above can be performed after narrowing down the images to image analysis candidates by user designation of a shooting date period or a folder.

In addition, according to each embodiment described above, image selection was performed so that the number of images would be equal to or less than the upper limit count for image analysis in the application. However, the present invention is not limited to this. For example, the upper limit count for image analysis can be determined in accordance with the conditions designated by the user. For example, if the user designates "high speed" or "medium speed" as the album creation speed, an upper limit count can be set in accordance with each "high speed" or "medium speed". In this case, the upper limit count is set to be higher in the case of "medium speed" than in the case of "high speed". Furthermore, if the user designates "low speed", image analysis can be performed on all of the images without selecting images from the image analysis candidates.

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2015-045089, filed Mar. 6, 2015, which is hereby incorporated by reference herein in its entirety.

What is claimed is:

1. An information processing method for an information processing apparatus that lays out a plurality of images, the method comprising:
   accepting, from a user, a designation of setting for laying out the plurality of images;
   obtaining images stored in the information processing apparatus according to the accepted designation from the user;
   determining, before at least one of the obtained images is scored, whether or not a number of the obtained images is more than a predetermined threshold which differs according to the accepted designation from the user;
   selecting, before at least one of the obtained images is scored, images from the obtained images, in a first case where the determining determines that the number of the obtained images is more than the predetermined threshold, so as to make the number of the selected images equal to the predetermined threshold;
   in the first case, scoring the selected images while not scoring any image other than the selected images among the obtained images, wherein since the predetermined threshold differs according to the accepted designation, (a) the number of the selected images to be scored differs according to the accepted designation and (b) a number of any image other than the selected images differs according to the accepted designation;
   in a second case where the determining determines that the number of the obtained images is not more than the predetermined threshold, scoring all of the obtained images; and
   laying out, in the first case, on a template selected based on a user's instruction using an input device and a monitor provided in the information processing apparatus, images among the selected images based on the scoring in the first case, and laying out, in the second case, on the template, images among the obtained images based on the scoring in the second case,
   wherein a central processing unit of the information processing apparatus executes the accepting, the obtaining, the determining, the selecting, the scoring, and the laying out.

2. The method according to claim 1, wherein in the selecting, the number of the obtained images are randomly selected so as to be equal to the predetermined threshold.

3. The method according to claim 1, wherein the selecting comprises:
   sorting the obtained images by using a shooting time of each of the obtained images as a key;
   acquiring a shooting time difference between each of the sorted images;
   further sorting the sorted images by using each acquired shooting time difference as a key; and
   deleting an image with a smallest shooting time difference from the further sorted images until a number of the further sorted images becomes not more than the predetermined threshold,
   wherein the selected images are sorted images after the deleting.

4. The method according to claim 1, wherein in the selecting, the obtained images are sorted by using a shooting time of each of the obtained images as a key, and an analysis target image is selected for each predetermined number of images from the sorted images.

5. The method according to claim 1, wherein in the selecting, the obtained images are grouped for each specific period, based on a shooting time of each of the obtained images, and images are equally deleted from the grouped images so as to select a number of images not more than the predetermined threshold.

6. The method according to claim 2, wherein in the selecting, if a shooting time of each of the obtained images is before a specific time which is a time tracing back from a current date, the image is deleted.

7. The method according to claim 3, wherein in the selecting, if a shooting time of each of the obtained images is before a specific time which is a time tracing back from a current date, the image is deleted.

8. The method according to claim 4, wherein in the selecting, if a shooting time of each of the obtained images is before a specific time which is a time tracing back from a current date, the image is deleted.

9. The method according to claim 5, wherein in the selecting, if a shooting time of each of the obtained images is before a specific time which is a time tracing back from a current date, the image is deleted.

10. The method according to claim 2, further comprising:
setting a specific target object and associated information of the specific target object to the selected and scored images to further select images,
wherein in the selecting, images are selected by using the associated information set in the setting.

11. The method according to claim 10, further comprising saving a selection condition used in the selecting.

12. The method according to claim 1, further comprising:
setting a period in which images to be obtained for album re-creation were shot, based on an album already created in the laying out;
re-obtaining images from images included in the already created album, based on the period set in the setting; and
comparing a sum of a number of images included in the period set in the setting and a number of the re-obtained images with the predetermined threshold,
wherein in the selecting, if the sum of the number of images exceeds the predetermined threshold as a result of the comparison, the re-obtained images are selected so as to make the sum of the number of images equal to the predetermined threshold.

13. The method according to claim 1, further comprising outputting image data of an album created in the laying out as print data to a printer.

14. The method according to claim 13, wherein the printer is one of a printer connected to the information processing apparatus and a printer connected via a network.

15. A non-transitory computer-readable storage medium which stores a computer program to be executed in a processor of an information processing apparatus, the program comprising:
accepting, from a user, a designation of setting for laying out the plurality of images;
obtaining images stored in the information processing apparatus according to the accepted designation from the user;
determining, before at least one of the obtained images is scored, whether or not a number of the obtained images is more than a predetermined threshold which differs according to the accepted designation from the user;
selecting, before at least one of the obtained images is scored, images from the obtained images, in a first case where the determining determines that the number of the obtained images is more than the predetermined threshold, so as to make a number of the selected images equal to the predetermined threshold;
in the first case, scoring the selected images while not scoring any image other than the selected images among the obtained images, wherein since the predetermined threshold differs according to the accepted designation, (a) the number of the selected images to be scored differs according to the accepted designation and (b) a number of any image other than the selected images differs according to the accepted designation;
in a second case where the determining determines that the number of the obtained images is not more than the predetermined threshold, scoring all of the obtained images; and
laying out, in the first case, on a template selected based on a user's instruction using an input device and a monitor provided in the information processing apparatus, images among the selected images, based on the scoring in the first case, and laying out, in the second case, on the template, images among the obtained images based on the scoring in the second case.

16. An information processing apparatus that lays out a plurality of images, the apparatus comprising:
an input device configured to at least accept, from a user, a designation of setting for laying out the plurality of images;
a monitor;
an obtaining unit configured to obtain images stored in the information processing apparatus according to the designation from the user accepted by the input device;
a determination unit configured to determine, before at least one of the obtained images is scored, whether or not a number of the obtained images is more than a predetermined threshold which differs according to the designation from the user;
a selection unit configured to select, before at least one of the obtained images is scored, in a first case where the determination unit determines that the number of the obtained images by the obtaining unit is more than the predetermined threshold, images from the obtained images so as to make the number of the selected images equal to the predetermined threshold;
a scoring unit configured to, (1) in the first case, score the selected images but not score any image other than the selected images among the obtained images, wherein since the predetermined threshold differs according to the designation from the user, (a) the number of the selected images to be scored differs according to the designation from the user and (b) a number of any image other than the selected images differs according to the designation from the user, and (2) in a second case where the determination unit determines that the number of the obtained images is not more than the predetermined threshold, score all of the obtained images; and
a layout unit configured to lay out, on a template selected based on a user's instruction using the input device and the monitor, in the first case, images among the selected images based on the scoring in the first case by the scoring unit, and to lay out, in the second case, on the template, images among the obtained images based on the scoring in the second case by the scoring unit.

17. The method according to claim 1, wherein data for creating an album is generated by laying out the plurality of images on the template, and
wherein the designation of setting for laying out the plurality of images is a designation of setting an album creation speed.

18. The method according to claim 17, wherein if a first speed is designated as the album creation speed, the predetermined threshold is a first value, and wherein if a second speed smaller than the first speed is designated as the album creation speed, the predetermined threshold is a second value greater than the first value.

19. The method according to claim 1, wherein data for creating an album is generated by laying out the plurality of images on the template, wherein in the first case, and in a case where a setting of a main character of the album is accepted, images whose number is equal to the predetermined threshold are selected from images taken in a first shooting date period based on information on the main character among the obtained images, and wherein in the first case, and in a case where the setting of the main character of the album is not accepted, images whose number is equal to the predetermined threshold are selected from images taken in a second shooting date period different from the first shooting date period among the obtained images.

20. The method according to claim 19, wherein the information on the main character is information on a birthday of the main character, and wherein the first shooting date period is a period based on the birthday of the main character.

* * * * *